(12) United States Patent
Iinuma et al.

(10) Patent No.: US 7,422,336 B2
(45) Date of Patent: Sep. 9, 2008

(54) VEHICLE SIDE MIRROR

(75) Inventors: Yusuke Iinuma, Yamato (JP); Daichi Kinoshita, Naka-gun (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/486,234

(22) Filed: Jul. 13, 2006

(65) Prior Publication Data

US 2007/0014040 A1 Jan. 18, 2007

(30) Foreign Application Priority Data

Jul. 13, 2005 (JP) .............................. 2005-204458

(51) Int. Cl.
  *G02B 5/10* (2006.01)
  *G02B 7/182* (2006.01)
  *B60R 7/06* (2006.01)
(52) U.S. Cl. ........................ 359/850; 359/864; 359/866; 359/868; 359/900
(58) Field of Classification Search ................. 359/850, 359/864, 865, 866, 868, 900
See application file for complete search history.

(56) References Cited

U.S. PATENT DOCUMENTS

| | | | | |
|---|---|---|---|---|
| 2,279,751 | A | * | 4/1942 | Hensley ...................... 359/866 |
| 3,764,201 | A | * | 10/1973 | Haile .......................... 359/864 |
| 6,511,189 | B1 | * | 1/2003 | Henion et al. ................ 359/850 |
| 7,052,149 | B2 | * | 5/2006 | Suzuki et al. ................ 359/850 |
| 7,055,974 | B1 | * | 6/2006 | Matsuura et al. ............ 359/850 |
| 2004/0120055 | A1 | | 6/2004 | Suzuki |
| 2006/0132943 | A1 | * | 6/2006 | Suzuki et al. ................ 359/879 |

FOREIGN PATENT DOCUMENTS

| | | | |
|---|---|---|---|
| DE | 20211678 | | 10/2002 |
| DE | 10319881 | | 11/2004 |
| EP | 0835785 | | 4/1998 |
| EP | 1671843 | | 6/2006 |
| GB | 2092534 | * | 8/1982 |
| JP | 56-1903 | * | 1/1981 |
| JP | 2-144240 | * | 6/1990 |
| JP | 10-59071 | * | 3/1998 |
| JP | 2004196218 | | 7/2004 |
| JP | 2004237959 | | 8/2004 |
| JP | 2005-7998 | * | 1/2005 |
| WO | WO 01/79030 | * | 10/2001 |

* cited by examiner

*Primary Examiner*—Ricky D Shafer
(74) *Attorney, Agent, or Firm*—Global IP Counselors, LLP

(57) ABSTRACT

A vehicle side mirror that can visually confirm the blind spot of the main mirror without providing a prism or a fresnel lens on the window glass is provided. The vehicle side mirror is equipped with mirror housing attached to the side of the vehicle body and main mirror attached to the rear surface of mirror housing. The first sub-mirror that reflects the blind spot at the front side of the vehicle is provided on the side surface of mirror housing so as to face the vehicle body and second sub-mirror that reflects the blind spot at the center side of the vehicle is provided at the bottom portion of the rear surface of mirror housing.

16 Claims, 3 Drawing Sheets

VEHICLE SIDE MIRROR

CROSS REFERENCES TO RELATED APPLICATION

This application claims priority from Japanese Patent Application Ser. No. 2005-2044458 filed Jul. 13, 2005, the entire contents of which is incorporated herein by reference.

TECHNICAL FIELD

The present invention pertains to a vehicle side mirror that is attached to the side of the vehicle body.

BACKGROUND

Conventional technology for a mirror system that confirms the area to the side of a vehicle is already known. (Refer to Unexamined Japanese Patent Application Publication No. 2004-196218.)

For this type of mirror system, in addition to a side mirror, a prism or fresnel lens is provided on the window glass in front of the side window so that the front area of the side of the vehicle, in other words the blind spot, can be visually confirmed.

However, for such a mirror system, since a prism or a fresnel lens is provided on the window glass, the field of view, which is the portion that can be directly viewed through the window glass, would get obstructed by the prism or the fresnel lens.

SUMMARY

The purpose of the present invention is to provide a vehicle side mirror that can visually confirm the blind spot of the main mirror.

The present invention is a vehicle side mirror equipped with a mirror housing attached to the side of the vehicle body and a main mirror attached to the rear surface of the mirror housing on the vehicle body, and is characterized in that the first sub-mirror that reflects the blind spot at the front side of the vehicle is provided on the side of the aforementioned mirror housing so as to face the vehicle body and the second sub-mirror that reflects the blind spot at the center side of the vehicle is provided on the bottom portion of the rear surface of the mirror housing.

According to the present invention, since the first sub-mirror that reflects the blind spot at the front side of the vehicle is provided on the side of the mirror housing and the second sub-mirror that reflects the blind spot at the center side of the vehicle is provided on the bottom portion of the rear surface of the mirror housing, the blind spots can be visually confirmed without installing a prism or a fresnel lens on the window glass.

DETAILED DESCRIPTION

Next is provided an explanation of the most favorable embodiment of the vehicle side mirror pertaining to the present invention.

Embodiment 1

Figure 1:
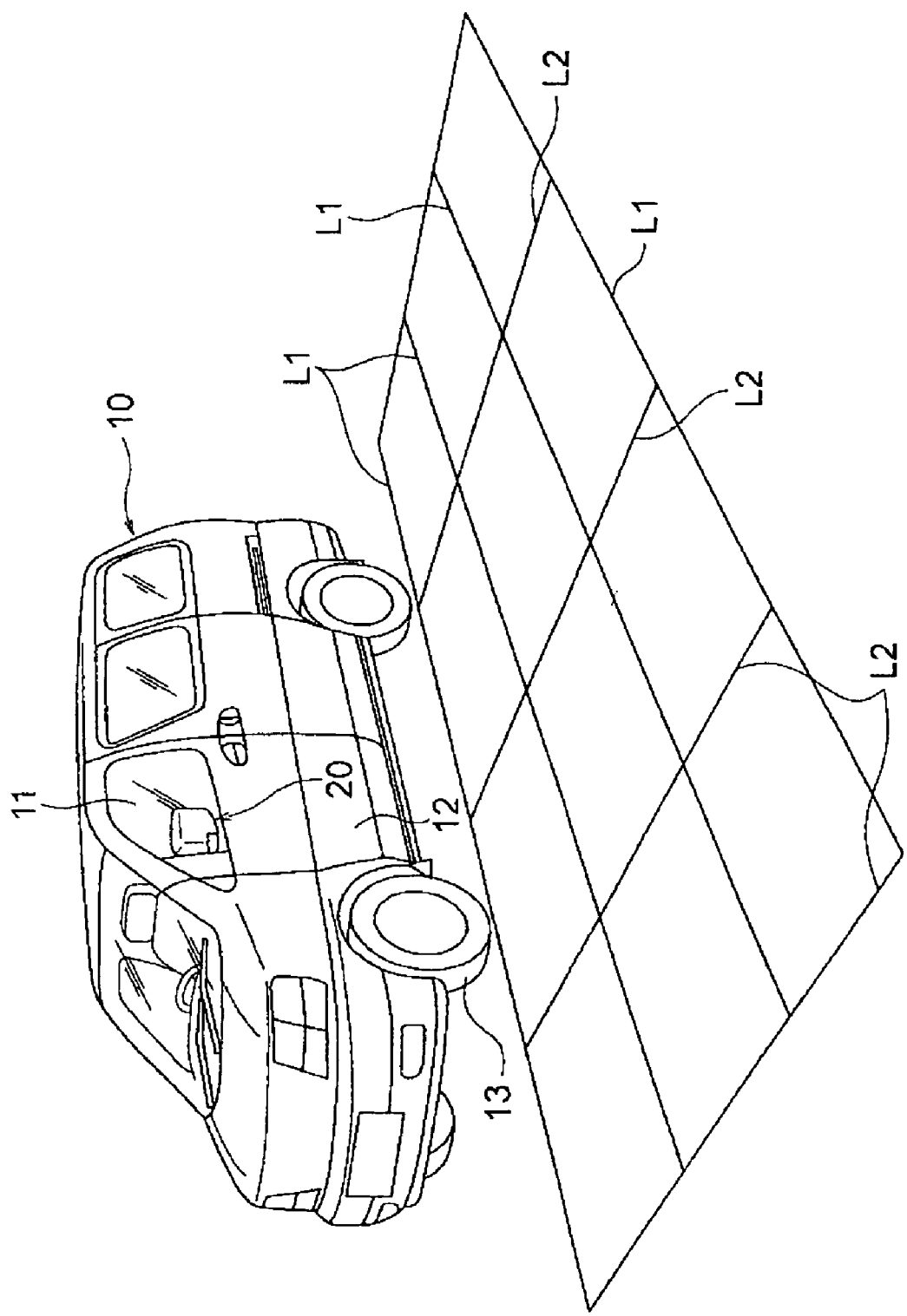
FIG. 1 is an explanatory diagram showing a vehicle equipped with the vehicle side mirror pertaining to the most favorable embodiment of the present invention.

Vehicle side mirror 20 is attached to the front portion of side window 11, which is the vehicle body side portion of vehicle 10 shown in FIG. 1.

Figure 2:
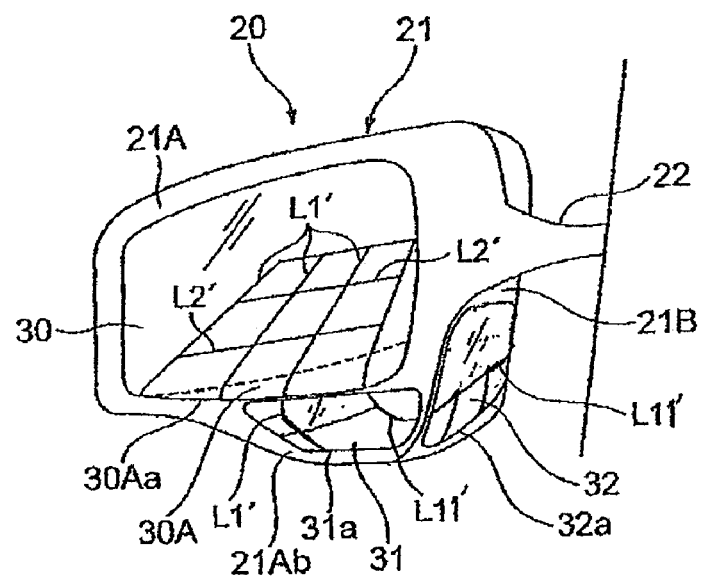
FIG. 2 is a perspective view of the vehicle side mirror shown in FIG. 1.

As shown in FIG. 2, vehicle side mirror 20 comprises mirror housing 21, main mirror 30 attached to rear surface 21A of said mirror housing 21, and arm portion 22, which attaches mirror housing 21 to the vehicle body side portion.

Main mirror 30 is a convex mirror that curves in a predetermined curvature. The curvature of the bottom portion 30A (the portion below the dashed line) of main mirror 30 becomes increasingly larger than the predetermined curvature toward the bottom portion.

Furthermore, sub-mirror 31, which is the convex mirror, is serially provided to main mirror 30 at the bottom portion 21Ab of the rear surface 21A of mirror housing 21.

The curvature of sub-mirror 31 is set to be the same as the curvature of the lowest portion 30Aa of the bottom portion 30A of main mirror 30, and the image reflected in sub-mirror 31 is the convex mirror formed by the curvature that is serially reflected in main mirror 30 from sub-mirror 31 when the vehicle is moving forward. In addition, sub-mirror 32 is provided in a position that is below arm portion 22 on side surface 21B of mirror housing 21 so as to face the vehicle body of vehicle 10.

The lower end 32a of sub-mirror 32 and the lower end 31a of sub-mirror 31 are the same height. In addition, the curvature of sub-mirror 32 is set to be the same curvature as sub-mirror 31, and the image reflected in sub-mirror 32 of side mirror 20 that is the convex mirror formed by the curvature is serially reflected in sub-mirror 31 from sub-mirror 32 of side mirror 20 as the vehicle moves forward.

Figure 3:
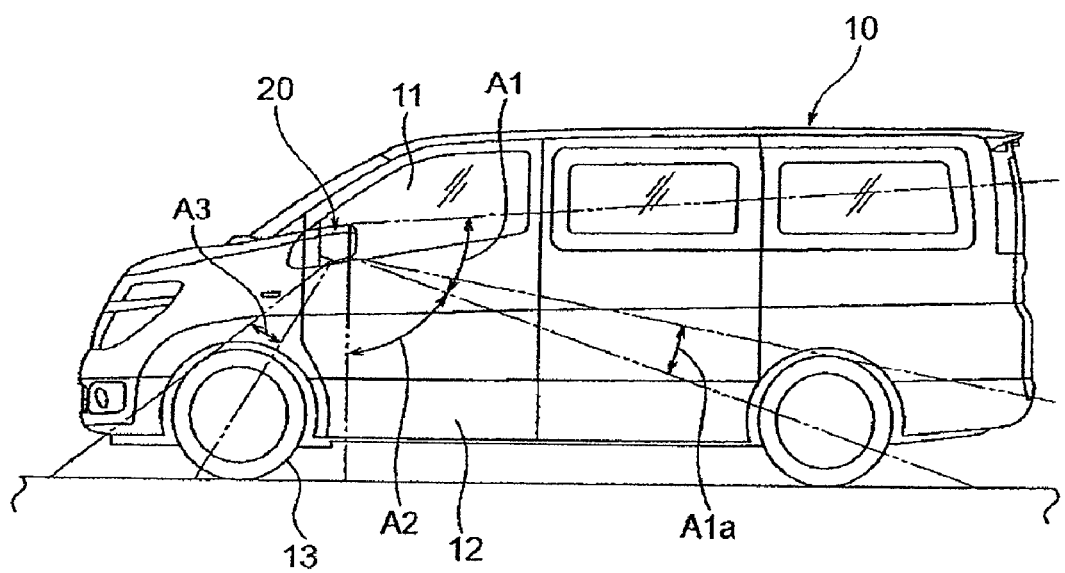
FIG. 3 is an explanatory diagram showing the field of view areas of the vehicle side mirror shown in FIG. 1.

Then, as shown in FIG. 3, main mirror 30 of side mirror 20 reflects the rear of vehicle 10 as field of view area A1, sub-mirror 31 reflects the road surface to the side of the vehicle, which is near front door 12 and is the blind spot of main mirror 30, or in other words reflects the road surface from the side of the front tire to the side of the rear tire (the blind spot at the center side of the vehicle) as field of view area A2, and sub-mirror 32 reflects the road surface at the side near front wheel 13, (the blind spot at the front side of the vehicle) which is the blind spot of main mirror 30, as field of view area A3.

In addition, the range A1a of the bottom side portion of field of view area A1 of main mirror 30 is the field of view area of the bottom portion 30A of main mirror 30.

For this type of vehicle side mirror 20, since sub-mirrors 31 and 32 are provided on mirror housing 21, field of view areas A1 and A2, which are the blind spots of main mirror 30, can be visually confirmed without installing a prism or a fresnel lens on the window glass, and the field of view, which is the portion that can be directly viewed through the window glass, does not get obstructed by the prism or the fresnel lens, as was the case in the conventional technology.

Furthermore, since the curvature of the bottom portion 30A of main mirror 30 becomes increasingly larger to equal that of sub-mirror 31, the field of view of mirrors 30 and 31 becomes vague, the image reflected in mirrors 30 and 31 becomes serially larger, and thus easier to see, and the sense of discomfort experienced in viewing that image can be significantly reduced.

As shown in FIG. 1, for example, since lines L1 and L2 drawn next to vehicle 10 are serially reflected as images L1' and L2' in mirrors 30, 31 and 32, they are very easy to see. Furthermore, the curvature of sub-mirror 32 is set to be the same as that of sub-mirror 31, the image reflected in sub-mirror 32 of side mirror 20 formed by the curvature is serially reflected in sub-mirror 31 from sub-mirror 32 of side mirror 20 as the vehicle moves forward, and the image reflected in sub-mirror 31 formed by the curvature is serially reflected in main mirror 30 from sub-mirror 31 as the vehicle moves forward, so the image reflected in side mirror 20 is serially reflected specifically along the line indicated as L11' from sub-mirror 32 of side mirror 20 to sub-mirror 31 to the main mirror 30. Therefore, the driver can grasp the serial positions of the image reflected in the mirror as the vehicle moves.

In addition, since the lower end 31a of sub-mirror 31 and the lower end 32a of sub-mirror 32 are set to be the same height, the image reflected in sub-mirror 31 and the image reflected in sub-mirror 32 appear to be reflected serially, thus reducing the feeling of discomfort experienced by the passenger when viewing the images in sub-mirrors 31 and 32. Also, since sub-mirror 32 is placed in a position below arm portion 22, in other words, since arm portion 22 is installed above sub-mirror 32, arm portion 22 does not obstruct the field of view of sub-mirror 32.

In addition, for the present embodiment, although the curvature of the bottom portion 30A of main mirror 30 becomes increasingly larger in order to coincide with the curvature of sub-mirror 31, the bottom portion 30A of main mirror 30 can be made flat and the top portion of sub-mirror 31 can also be the same flat shape as 30A, so that the curvature becomes increasingly larger.

Embodiment 2

Figure 4:
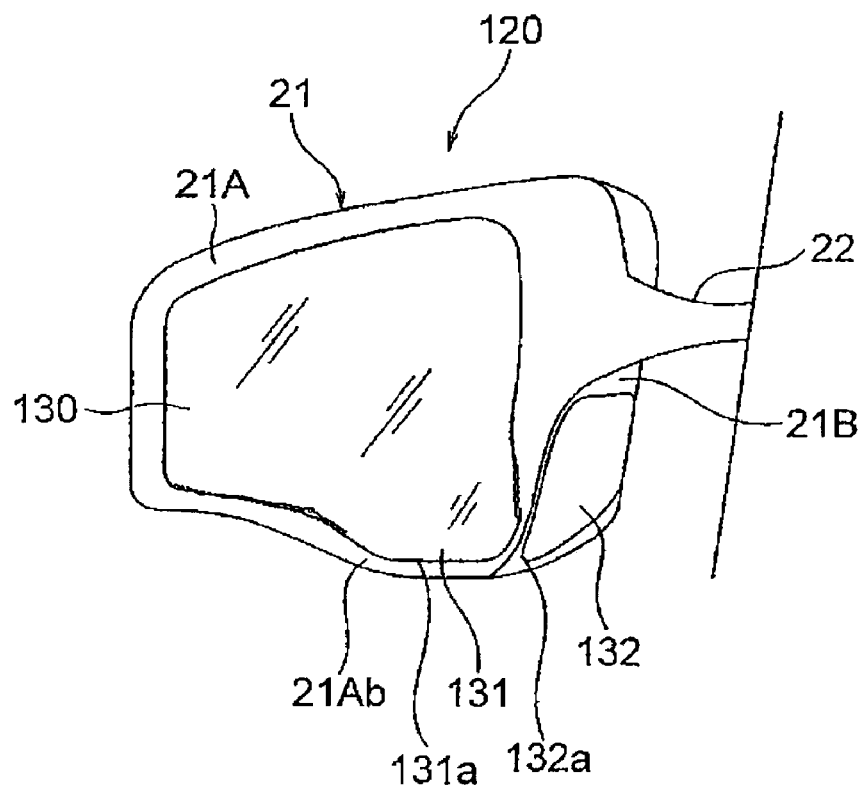
FIG. 4 is an explanatory diagram showing the vehicle side mirror for Embodiment 2.

FIG. 4 shows vehicle side mirror 120 of Embodiment 2. Vehicle side mirror 120 is comprised of main mirror 130 attached to rear surface 21A of mirror housing 21, sub-mirror 131 (the second sub-mirror) provided at the bottom portion 21Ab of the rear surface 21A of mirror housing 21 and sub-mirror 132 (the first sub-mirror) provided at the side surface 21B of mirror housing 21.

Sub-mirror 131 is serially provided on main mirror 130, and the curvature of sub-mirror 131 is set to be larger than the curvature of main mirror 130. In addition, the lower end 131a of sub-mirror 131 and the lower end 132a of sub-mirror 132 are set to be the same height, and the curvature of sub-mirror 131 is set to be the same as the curvature of sub-mirror 132.

Figure 5:
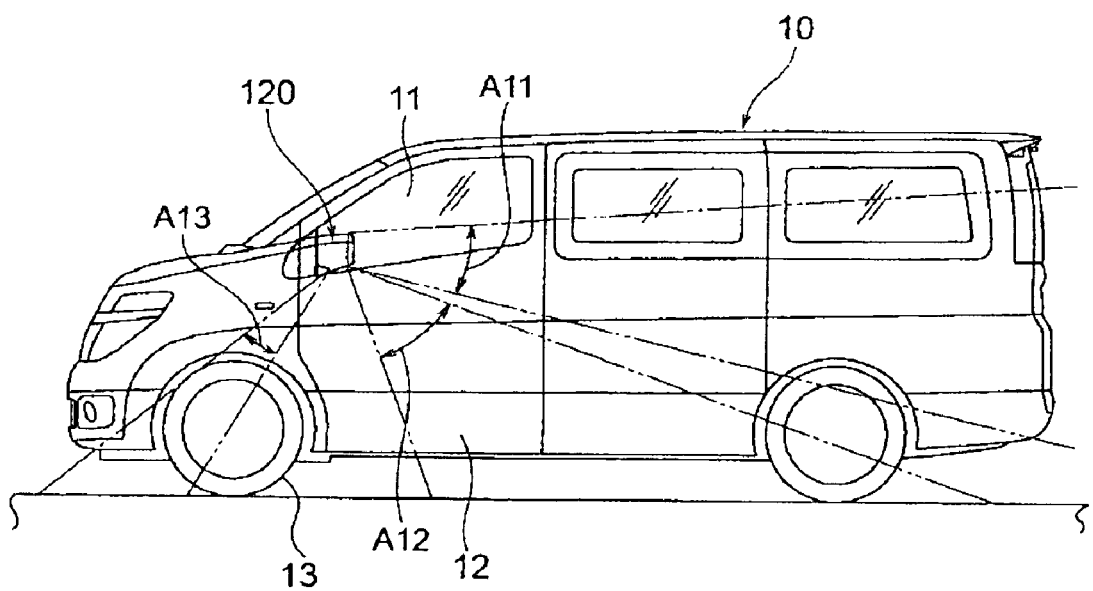
FIG. 5 is an explanatory diagram showing the field of view areas of the vehicle side mirror for Embodiment 2.

As shown in FIG. 5, for vehicle side mirror 120, main mirror 130 reflects the rear of vehicle 10 as field of view area A11, sub-mirror 131 reflects the side near front door 12 (the blind spot at the center side of the vehicle) as field of view area A12, and sub-mirror 132 reflects the side near front wheel 13 (the blind spot at the front side of the vehicle) as field of view area A13.

Vehicle side mirror 120 allows for visual confirmation of field of view areas A11 and A12, or the blind spots of main mirror 130, which was also the case in Embodiment 1, and unlike conventional technology, the portion of the field of view that can be viewed directly through the window glass is not obstructed by the prism or the fresnel lens installed on it.

In addition, since the lower end 131a of sub-mirror 131 and the lower end 132a of sub-mirror 132 are set to be the same height, the image reflected in sub-mirror 131 and the image reflected in sub-mirror 132 appear to be reflected serially, thus reducing the feeling of discomfort experienced by the passenger when viewing the images in sub-mirrors 131 and 132.

Furthermore, since sub-mirror 132 is installed in a position below arm portion 22, arm portion 22 does not obstruct the field of view of sub-mirror 132.

For the aforementioned embodiments, main mirrors 30 and 130 and sub-mirrors 31 and 131 are separate units, but by serially providing sub-mirrors 31 and 131 on main mirrors 30 and 130, sub-mirrors 31 and 131 and main mirrors 30 and 130 can be constructed as a single unit, resulting in a reduced cost.

An explanation has been provided for the most favorable embodiment of the present invention, but design revisions are included in this invention as long as they do not deviate from the gist of the invention.

What is claimed is:

1. A vehicle side mirror comprising:
   a mirror housing attached to a side of a vehicle body of a vehicle;
   a main mirror attached to a rear surface of the mirror housing to form a main image;
   a first sub-mirror that reflects a blind spot at a forward area of the side of the vehicle body to form a first sub-image, the first sub-mirror being provided on the side of the mirror housing so as to face the vehicle body; and
   a second sub-mirror that reflects a blind spot at a center area of the side of the vehicle body to form a second sub-image, the second sub-mirror being provided on a bottom portion of the rear surface of the mirror housing on the vehicle body,
   the second sub-mirror being arranged with adjacent edges of the first and second sub-images and adjacent edges of the main image and the second sub-image mating, respectively, and curvatures of a bottom portion of the main mirror and the second sub-mirror being the same and curvatures of the first and second sub-mirrors being the same, to form a serial image that continuously moves from the first sub-mirror to the main mirror via the second sub-mirror as the vehicle moves in a forward direction.

2. The vehicle side mirror of claim 1, wherein the second sub-mirror is a convex mirror.

3. The vehicle side mirror of claim 1, wherein the first sub-mirror is a convex mirror.

4. The vehicle side mirror of claim 1, wherein
   the second sub-mirror is serially provided on the main mirror, and a curvature of the second sub-mirror is larger than a curvature of the main mirror.

5. The vehicle side mirror of claim 1, wherein
   a lower end of the first sub-mirror and a lower end of the second sub-mirror are set to be approximately the same height.

6. The vehicle side mirror of claim 1, wherein
   an arm portion that attaches the mirror housing to the vehicle body is provided above the first sub-mirror.

7. A vehicle side mirror comprising:
   a mirror housing attached to a side of a vehicle body of a vehicle;
   a main mirror attached to a rear surface of the mirror housing to form a main image;
   a first sub-mirror that reflects a blind spot at a forward area of the side of the vehicle body to form a first sub-image, the first sub-mirror being provided on the side of the mirror housing so as to face the vehicle body; and
   a second sub-mirror that reflects a blind spot at a center area of the side of the vehicle body to form a second sub-image, the second sub-mirror being provided on a bottom portion of the rear surface of the mirror housing on the vehicle body, the second sub-mirror being arranged with adjacent edges of the first and second sub-images and adjacent edges of the main image and the second sub-image mating, respectively, to form a serial image that continuously moves from the first sub-mirror to the main mirror via the second sub-mirror as the vehicle moves in a forward direction, a curvature of a bottom of the main mirror being larger than a curvature of a top, and the curvature of the bottom of the main mirror and a curvature of the second sub-mirror being approximately the same.

8. A vehicle side mirror comprising:

a main mirror provided on the side of the vehicle body that reflects a rear of a vehicle body of a vehicle to form a main image so that it can be seen by the driver;

a first sub-mirror provided on a side of the main mirror near the vehicle body that reflects a road surface on the side of a front tire to form a first sub-image; and a second sub-mirror provided below the main mirror toward the vehicle body that reflects the road surface on the side of the vehicle body to form a second sub-image, the second sub-mirror being arranged with adjacent edges of the first and second sub-images and adjacent edges of the main image and the second sub-image mating, respectively, and curvatures of a bottom portion of the main mirror and the second sub-mirror being the same and curvatures of the first and second sub-mirrors being the same, to form a serial image that continuously moves from the first sub-mirror to the main mirror via the second sub-mirror as the vehicle moves in a forward direction.

9. The vehicle side mirror of claim 8, wherein the second sub-mirror is a convex mirror.

10. The vehicle side mirror of claim 8, wherein the first sub-mirror is a convex.

11. The vehicle side mirror of claim 8, wherein the second sub-mirror is serially provided on the main mirror, and a curvature of the second sub-mirror is larger than a curvature of the main mirror.

12. The vehicle side mirror of claim 8, wherein a lower end of the first sub-mirror and a lower end of the second sub-mirror are set to be approximately the same height.

13. The vehicle side mirror of claim 8, wherein an arm portion that attaches the mirror housing to the vehicle body is provided above the first sub-mirror.

14. A vehicle side mirror comprising:

a main mirror provided on the side of the vehicle body that reflects a rear of a vehicle body of a vehicle to form a main image so that it can be seen by the driver;

a first sub-mirror provided on a side of the main mirror near the vehicle body that reflects a road surface on the side of a front tire to form a first sub-image; and a second sub-mirror provided below the main mirror toward the vehicle body that reflects the road surface on the side of the vehicle body to form a second sub-image, the second sub-mirror being arranged with adjacent edges of the first and second sub-images and adjacent edges of the main image and the second sub-image mating, respectively, to form a serial image that continuously moves from the first sub-mirror to the main mirror via the second sub-mirror as the vehicle moves in a forward direction, a curvature of a bottom of the main mirror being larger than a curvature of a top, and the curvature of the bottom and a curvature of the second sub-mirror being set to be approximately the same.

15. A vehicle side mirror comprising:

means for reflecting a rear of a vehicle so that it can be seen by the driver;

means for reflecting a road surface on a side of a front tire; and means for reflecting the road surface on the side of a rear tire, the means for reflecting the rear of the vehicle, the means for reflecting the road surface on the side of the front tire and the means for reflecting the road surface on the side of the rear tire being configured to form a serial image that continuously moves from the means for reflecting the road surface on the side of the front tire to the means for reflecting the rear of the vehicle via the means for reflecting the road surface on the side of the rear tire as the vehicle moves in a forward direction, curvatures of adjacent portions of the means for reflecting the rear of the vehicle and the means for reflecting the road surface on the side of the rear tire being the same, and curvatures of the means for reflecting the road surface on the side of the front tire and the means for reflecting the road surface on the side of the rear tire being the same.

16. A method of monitoring blind spots from a vehicle, comprising:

reflecting a rear of the vehicle with a side mirror so that it can be seen by a driver;

reflecting a blind spot of a surface at a front side of the vehicle on the side of a front tire with a first sub-mirror; and reflecting a blind spot of a surface on a side of a rear tire of the vehicle with a second sub-mirror, the side mirror, first sub-mirror and second sub-mirror being configured to form a serial image of the rear of the vehicle and of the blind spots that continuously moves from the first sub-mirror to the side mirror via the second sub-mirror as the vehicle moves in a forward direction, curvatures of a bottom portion of the side mirror and the second sub-mirror being the same, and curvatures of the first and second sub-mirrors being the same.

* * * * *